United States Patent
Iwata et al.

(10) Patent No.: US 8,807,267 B2
(45) Date of Patent: Aug. 19, 2014

(54) SELF RESONANCE-TYPE SOUND-PRODUCING SPEAKER AND METHOD OF PLACING THEREOF

(71) Applicant: C-Eng Co., Ltd., Gamagori (JP)

(72) Inventors: Harumi Iwata, Ogaki (JP); Keiko Takaoka, Gamagori (JP)

(73) Assignee: C-Eng Co., Ltd., Gamagori-Shi (JP)

( * ) Notice: Subject to any disclaimer, the term of this patent is extended or adjusted under 35 U.S.C. 154(b) by 0 days.

(21) Appl. No.: 13/837,215

(22) Filed: Mar. 15, 2013

(65) Prior Publication Data

US 2013/0228392 A1    Sep. 5, 2013

Related U.S. Application Data

(63) Continuation-in-part of application No. PCT/JP2012/004643, filed on Jul. 21, 2012.

(30) Foreign Application Priority Data

Jul. 21, 2011    (JP) ................. 2011-159575

(51) Int. Cl.
*H04R 1/28* (2006.01)
*H04R 7/04* (2006.01)
*G10K 11/08* (2006.01)
*B29C 44/12* (2006.01)
*H04R 1/20* (2006.01)
*H04R 7/02* (2006.01)
*H04R 1/02* (2006.01)

(52) U.S. Cl.
CPC ................ *G10K 11/08* (2013.01); *H04R 1/026* (2013.01); *H04R 7/04* (2013.01); *H04R 1/28* (2013.01); *B29C 44/1233* (2013.01); *H04R 2499/13* (2013.01); *H04R 2499/15* (2013.01); *H04R 2201/023* (2013.01); *H04R 1/025* (2013.01)
USPC ........... 181/148; 181/150; 381/345; 381/388; 381/301; 381/333

(58) Field of Classification Search
CPC ........ H04R 1/28; H04R 1/2803; H04R 1/025; H04R 1/026; H04R 7/045; H04R 7/10; H04R 2201/023; G10K 11/08; B29C 44/1233; B29C 44/12
USPC .......... 181/148, 150, 199, 180, 175; 381/345, 381/161, 162, 388, 301, 333; 264/46.5
See application file for complete search history.

(56) References Cited

U.S. PATENT DOCUMENTS 3,290,450 A * 12/1966 Barna ........................... 381/182
3,384,719 A *  5/1968 Lanzara ....................... 381/301
(Continued)

FOREIGN PATENT DOCUMENTS

JP        62-141289 U     9/1987
JP         2-40693 A      2/1990
(Continued)

*Primary Examiner* — Edgardo San Martin
(74) *Attorney, Agent, or Firm* — Matthias Scholl, PC; Matthias Scholl

(57) ABSTRACT

A self resonance-type sound-producing speaker that is waterproof and readily attachable. The self resonance-type sound-producing speaker includes an actuator speaker unit and a polymer foam arranged to cover the entire outer surface of this speaker unit and converts the vibrations from the speaker unit into plane waves to externally produce sound. The polymer foam preferably has the expansion ratio of 10 to 30 times and the closed pore structure. The thickness of the polymer foam is preferably not less than 2 mm and is more preferably not less than 3 mm.

9 Claims, 15 Drawing Sheets

(56) References Cited

U.S. PATENT DOCUMENTS

| | | | |
|---|---|---|---|
| 4,807,294 A * | 2/1989 | Iwata et al. | 381/190 |
| 4,928,312 A * | 5/1990 | Hill | 381/424 |
| 5,031,222 A * | 7/1991 | Takaya | 381/190 |
| 5,123,133 A * | 6/1992 | Albert | 5/639 |
| 5,203,560 A * | 4/1993 | Wang | 29/899 |
| 5,387,026 A * | 2/1995 | Matsuhashi et al. | 297/217.4 |
| 6,324,294 B1 * | 11/2001 | Azima et al. | 381/381 |
| 6,991,289 B2 * | 1/2006 | House | 297/217.4 |
| 7,218,745 B2 * | 5/2007 | McConnell et al. | 381/302 |
| 7,685,661 B2 * | 3/2010 | Popilek et al. | 5/639 |
| 7,771,375 B2 * | 8/2010 | Nishibori et al. | 601/47 |
| 8,506,455 B2 * | 8/2013 | Cowett | 482/8 |
| 2001/0026625 A1 * | 10/2001 | Azima et al. | 381/152 |
| 2003/0012397 A1 * | 1/2003 | Gurner | 381/386 |
| 2007/0025575 A1 * | 2/2007 | Oser et al. | 381/333 |

FOREIGN PATENT DOCUMENTS

| | | |
|---|---|---|
| JP | 2002-64898 A | 2/2002 |
| JP | 2006-253735 A | 9/2006 |
| JP | 2008-141570 A | 6/2008 |
| JP | 2008-153942 A | 7/2008 |
| JP | 2010-166515 A | 7/2010 |

* cited by examiner

SELF RESONANCE-TYPE SOUND-PRODUCING SPEAKER AND METHOD OF PLACING THEREOF

CROSS-REFERENCE TO RELATED APPLICATIONS

This application is a continuation-in-part of International Patent Application No. PCT/JP2012/004643 with an international filing date of Jul. 21, 2012, designating the United States, now pending, and further claims priority benefits to Japanese Patent Application No. 2011-159575, filed on Jul. 21, 2011. The contents of all of the aforementioned applications, including any intervening amendments thereto, are incorporated herein by reference. Inquiries from the public to applicants or assignees concerning this document should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The present invention relates to a self resonance-type sound-producing speaker that is coated with a cover material and has a mechanism of receiving sound-producing vibrations by a speaker unit, amplifying the received sound-producing vibrations and producing large sound.

2. Description of the Related Art

Proposed inventions in PTL1 to 3 are a speaker preferably used for a thin audio/video display, such as flat screen TV or a speaker system such as car stereo, an audio/video display using such a speaker and a speaker system including such a speaker.

CITATION LIST

Patent Literature

PTL1: JP 2008-141570A
PTL2: JP 2010-153942A
PTL3: JP 2010-166515A

SUMMARY OF THE INVENTION

Technical Problem

These proposed speakers, however, have various problems: for example, exposure of the frame of the speaker unit on the outside may cause insufficient waterproof property; the double-faced adhesive tape used for attachment of the frame may be readily detached; and screws or bolts used for fixation may cause distortion of sound. Especially when an attachment plate is in a concavo-concave shape or an attachment face of a structure, which the speaker is attached to, is in a concavo-concave shape, it is very difficult to attach the speaker by the conventional method using the double-faced adhesive tape or the bolts. These speakers are also unable to amplify the sound.

In order to make the conventional speaker waterproof, waterproof material should be selected for speaker components, such as cone and edge members, and special care is required for internal coils and wires.

Solution to Problem

In order to solve at least part of the above problems, according to one aspect of the invention, there is provided a self resonance-type sound-producing speaker, comprising: a speaker unit; and a polymer foam arranged to fully cover outer surface of the speaker unit, wherein the polymer foam amplifies sound-producing vibration from the speaker unit and produces sound in the form of plane waves.

The self resonance-type sound-producing speaker described herein means a speaker having a mechanism where a polymer foam covering an internal speaker unit receives sound-producing vibration output from the speaker unit and amplifies the received sound-producing vibration to produce large sound. The conventional speaker requires a large resonance box, but the system of the invention may be formed in a relatively free shape, such as thin plate-like shape, small spherical shape or any of other different shapes.

The method adopted to cover the speaker unit with the polymer foam may be natural foaming of the polymer foam to include the speaker unit, injection and foaming of the polymer foam in a mold to include the speaker unit, embedding the speaker unit into the polymer foam, and attachment of the polymer foam to the speaker unit. In the case of natural foaming, the polymer foam is cut in a predetermined thickness and a predetermined shape for size adjustment. When the speaker unit is covered with the polymer foam by natural foaming or by injection and foaming, the speaker unit should be free from deformation and heat-induced damage. The foaming temperature is preferably ordinary temperature to 80 degrees centigrade.

The following specifically describes a method of manufacturing the self resonance-type sound-producing speaker according to the invention by injection and foaming. When rigid polyurethane foam material is used for the polymer foam, the method tentatively places a speaker unit in a male/female mold at ordinary temperature, thoroughly mixes the liquid polymer foam material within several seconds, and injects the mixed liquid polymer foam material into the mold. The heat applied is only the heat of the polymer foam material. The foam of the high expansion ratio is obtained under no application of additional pressure by naturally introducing out the pressure produced in the course of foaming. When other materials are used for the polymer foam, the method may manufacture the polymer foam under application of heat or under pressure or under reduced pressure.

The polymer foam preferably has a closed pore structure. The expansion ratio is preferably 10 to 30 times.

The polymer foam described herein includes, for example, rigid polyurethane foam, rigid polystyrene foam, rigid polyethylene foam, rigid polypropylene foam, rigid phenol foam, rigid polyimide foam or rigid polyvinyl chloride foam.

The speaker unit included in the polymer foam may be, for example, cone speaker, actuator speaker, magnetostrictive speaker, piezoelectric speaker, or hybrid speaker.

The cone speaker described herein generally uses a dynamic speaker unit with a vibrating plate. The name is derived from a cone-shaped vibrating plate having a significantly larger diameter than the voice coil diameter. The vibrating plate may be in a dome shape or a planar shape.

The actuator speaker described herein means a speaker that converts voice current into vibration and brings the vibration in close contact with an attachment object, so as to produce sound from the attachment object. This is also called vibration speaker, which does not use specific vibrating plate like cone paper but uses an arbitrary attachment object as the sound-producing vibrating body.

The magnetostrictive speaker described herein means a speaker that uses a single crystal ultra magnetostrictive material and causes concavo-convex transformation by the flow of electric current to produce sound.

The piezoelectric speaker described herein means a speaker that applies a voltage between two piezoelectric elements and generates vibration by metal deformation caused by the potential difference.

The hybrid speaker described herein means a composite speaker that combines sound production by the vibrating membrane with the vibration of the actuator speaker.

The thickness of the polymer foam relative to the speaker unit is preferably not less than 2 mm and is more preferably not less than 3 mm. The polymer foam covers the speaker unit and additionally has a resonance structure. More specifically, the thickness of the polymer foam is preferably in the range of 2 mm to 40 mm. The thickness of the polymer foam is preferably 2 mm to 10 mm (one-side size) for the small-size self resonance-type sound-producing speaker (thickness of 10 mm to 20 mm) and is preferably 3 mm to 40 mm (one-side size) for the medium-size or the large-size self resonance-type sound-producing speaker (thickness of or over 20 mm). These values are, however, not restrictive and the thickness of the polymer foam may be set adequately by taking into account the type, the size, the shape and the installation location of the speaker unit.

According to another aspect of the invention, there is provided the self resonance-type sound-producing speaker that has an attachment plate placed outside of the polymer foam to transmit the sound-producing vibration to outside.

The attachment plate in contact with the polymer foam transmits the vibration from the speaker unit via the polymer foam to the attachment plate. This causes the attachment plate to be resonated and work as the sound-producing body. The metal that has generally less vibration can thus be used as the material for the attachment plate. The material for the attachment plate is not restricted to metal but may be, for example, glass, ceramics, wood or synthetic resin.

According to another aspect of the invention, there is provided the self resonance-type sound-producing speaker that is placed on an inner face of a casing included in external equipment or external construction, wherein the casing is used as the attachment plate.

According to another aspect of the invention, there is provided the self resonance-type sound-producing speaker that has the attachment plate placed outside of external equipment or external construction, wherein the polymer foam is attached to rear face of the attachment plate.

The external equipment or external construction described herein means separate equipment or construction from the self resonance-type sound-producing speaker, for example, automatic vending machine, a car washing machine, a laundry machine, any of various industrial machines, outdoor construction including wall surface, pillar, ceiling and floor of public construction and indoor construction including wall surface, pillar, ceiling and floor of lavatory, bathroom, dressing room, kitchen, and attic.

The casing described herein means a general plate member located outside of the external equipment or external construction, such as casing, decorative sheet or protective sheet included in the external equipment or external construction.

According to another aspect of the invention, there is provided the self resonance-type sound-producing speaker, wherein when the attachment plate is in a concavo-concave shape, the speaker unit is tentatively placed, and the polymer foam is injected into a space between the speaker unit and the attachment plate and is solidified to cover outside of the speaker unit.

According to another aspect of the invention, there is provided a method of placing a self resonance-type sound-producing speaker, comprising: a tentative positioning step of tentatively placing a speaker unit inside of a casing included in external equipment, such that a certain space is kept between the casing and the speaker unit; an injection step of injecting a polymer foam material into the space; and a foaming step of filling the space with the injected polymer foam material and foaming the polymer foam material, wherein the casing is used as an attachment plate that transmits sound-producing vibration to outside.

The polymer foam is preferably arranged to be in close contact with the speaker unit and is provided in such a manner that does not interfere with vibration of the speaker unit. For example, when the speaker unit is cone speaker, it is preferable that the cone (vibrating plate) vibrates in some degree of freedom and adequately transmits the vibration of the voice coil or the equivalent vibration to the coat of the polymer foam. For example, when the self resonance-type sound-producing speaker of the invention is attached to the attachment plate, it is preferable that the polymer foam is directly attached to the casing for the most efficient operation of the speaker. The self resonance-type sound-producing speaker of the invention can be attached in close contact with even the structure having the attachment surface in a concavo-convex shape. This ensures very clear sound amplification.

According to the invention, only coating the surface of the polymer foam with a waterproof layer ensures the sufficient waterproof property. Like the waterproof layer coating on the surface of the polymer foam for waterproof, coating of an acid-resistant material or alkali-resistant material as the countermeasure against a chemical such as strong acid or strong alkali enables sound production in the liquid of such acid or alkali or in the vapor of such acid or alkali.

According to the invention, covering the speaker unit with the polymer foam may cause accumulation of heat generated by the internal speaker unit. The countermeasure against such heat accumulation may be preferably operating the speaker at a fraction of the rated input or providing a thermo switch to form a current interruption circuit or a current reduction circuit.

Arranging the self resonance-type sound-producing speaker of the invention to be perpendicular to the directional axis of acceleration enables the self resonance-type sound-producing speaker to be operated without the effect of acceleration. This arrangement is effective when the self resonance-type sound-producing speaker is installed in a vehicle under large acceleration, such as space ship, space station or jet airplane. The internal speaker unit is protected from damage by the cushioning action of the polymer foam itself, in addition to receiving the load by not only the speaker unit but the entire polymer foam covering the speaker unit.

In the self resonance-type sound-producing speaker of the invention, an amplifier and a power source together with the speaker unit may be included in the polymer foam. The present invention is applicable to both the wired structure and the wireless structure.

The self resonance-type sound-producing speaker of the invention may be installed in any of various plumbing products and factories generating various oily smokes and dusts and machinery operated in such factories.

When it is desirable to produce sound from the wall surface, ceiling surface, pillar surface or floor surface of the metal plate, the wall plate, the floor plate or the ceiling plate with no protrusion or easily damaged surface in the public space, application of the invention enables sound production from the wall surface, the ceiling surface, or the floor surface without exposure of the speaker.

In such cases, the polymer foam in sufficient dimensions and sufficient shape for the desired volume of sound is attached in close contact with the rear face of the wall, the ceiling, the pillar or the floor.

The self resonance-type sound-producing speaker of the invention may be applicable to a thin panel-like sliding screen or folding screen.

According to one preferable embodiment, a pair of self resonance-type sound-producing speakers may be arranged across a predetermined distance to be opposed to each other on a pillow, cloth, mattress or seat.

According to one embodiment, outdoor construction, such as wall surface, pillar and ceiling of public construction, in a public space that does not allow exposure of the sound source may be protected by an attachment plate, and the self resonance-type sound-producing speaker may be attached to the rear face of the attachment plate. This enhances the convenience of attachment of the self resonance-type sound-producing speaker. Additionally, the attachment plate is resonated by the vibration of the polymer foam that is in contact with the attachment plate and thereby works as the sound producing body.

According to another embodiment, the metal plate included in an automatic vending machine, a car washing machine, a laundry machine, or any of various industrial machines at a location where protection with the metal plate is required may be used as the attachment plate, and the self resonance-type sound-producing speaker may be attached to the rear face of the attachment plate. Instead of the metal plate included in such equipment and machines, a panel of various displays may be used as the attachment plate, and the self resonance-type sound-producing speaker may be attached to the rear face of the attachment plate. This enhances the convenience of attachment of the self resonance-type sound-producing speaker. Additionally, the attachment plate is resonated by the vibration of the polymer foam that is in contact with the attachment plate and thereby works as the sound producing body.

According to another embodiment, casing included in equipment in a lavatory, bathroom, dressing room, kitchen or attic at a location easily exposed to water may be used as the attachment plate, and the self resonance-type sound-producing speaker may be attached to the inner surface of the attachment plate. This enhances the convenience of attachment of the self resonance-type sound-producing speaker. Additionally, the attachment plate is resonated by the vibration of the polymer foam that is in contact with the attachment plate and thereby works as the sound producing body.

The self resonance-type sound-producing speaker of the invention may be applicable to lane markers of a swimming pool.

The self resonance-type sound-producing speaker of the invention may be applied as sound-navigating lane markers for visually impaired people.

Advantageous Effects of Invention

In the self resonance-type sound-producing speaker of the invention, the speaker unit as the sound source is covered with the polymer foam. Even when the speaker unit alone has difficulty in sufficient sound production or has small volume of sound, the polymer foam is resonated to produce large sound or enhance the sound quality. More specifically, the sound can be produced externally through the polymer foam in the form of plane waves. Adjusting the dimensions and the shape of the polymer foam improves the sound directivity and enables the diverse sound control, such as amplification of sound or selective amplification of low-pitch sound. The amplification function of the polymer foam enables efficient use of the energy of sound-producing vibration at low output and thereby reduces noise.

When the cone speaker is used as the speaker unit, the sound produced from the speaker unit can be amplified by the polymer foam and transmitted to outside in the form of plane waves. The sound produced by the cone speaker is generally subject to diffused reflection in the form of spherical waves and is disadvantageously made unclear with increasing distance. The sound production in the form of plane waves, however, advantageously improves the linearity and outputs sound that is not readily decayed. The polymer foam allows vibration of the cone (vibrating plate) in some degree of freedom and serves to resonate and amplify the sound-producing vibration.

When the magnetostrictive speaker is used as the speaker unit, the polymer foam serves to resonate and amplify the sound output from the speaker unit. For example, setting the large flat area of the polymer foam especially enriches the low-pitch sound, compared with the structure without the polymer foam. The hybrid speaker used as the speaker unit has the similar advantageous effects. Coating the speaker unit with the polymer foam has the similar advantageous effects to those of the hybrid speaker.

When the actuator speaker is used as the speaker unit, the polymer foam serves to resonate the sound-producing vibration and externally produce sound. The actuator speaker does not produce sound without the vibrating body. The polymer foam has the sound-producing function as well as the amplification function.

In the self resonance-type sound-producing speaker of the invention, the frame of the speaker unit is not exposed on the outside, which improves the waterproof effect. The self resonance-type sound-producing speaker may be attached to lane markers of a swimming pool. This allows the underwater sound lane marker at the low cost.

The self resonance-type sound-producing speaker of the invention does not require any tape for attachment of the frame of the speaker unit and is thus free from the problem of detachment of the tape. The self resonance-type sound-producing speaker also does not require fixation of the frame with bolts or screws. This causes no distortion of sound.

The self resonance-type sound-producing speaker of the invention is made resistant to a pressure change to have the pressure-resistant, explosion-proof structure by coating with the polymer foam. This enables the self resonance-type sound-producing speaker to be used and produce sound even in a space that is subject to significant pressure change, for example, a space ship or a space station. The fully closed structure by coating with the polymer foam is the explosion-proof structure that is free from ignition of the explosive gas with electric spark.

According to the invention, setting the thickness of the polymer foam to or over 2 mm provides a minimum resonance structure having the resonance effect and the amplification effect as described above.

According to the invention, the attachment plate that transmits the sound-producing vibration to outside is provided outside of the polymer foam. This improves the convenience for attachment of the self resonance-type sound-producing speaker and additionally enables the attachment plate to be resonated and produce sound.

According to the invention, the self resonance-type sound-producing speaker is placed on the inner surface of the casing included in the external equipment or external construction, and the casing is used as the attachment plate. This improves the convenience for attachment to the existing structure without requiring any separate attachment plate.

According to the invention, the attachment plate is provided outside of the external equipment or external construction, and the polymer foam is attached to the rear face of the attachment plate. This enables the self resonance-type sound-producing speaker to be installed inexpensively even in the case that has difficulty in mounting the self resonance-type sound-producing speaker on the rear face of the casing of the existing structure.

DETAILED DESCRIPTION OF THE EMBODIMENTS

The following describes application of the invention to self resonance-type sound-producing speakers as embodiments 1 to 14 in detail with reference to the drawings.

Figure 1:
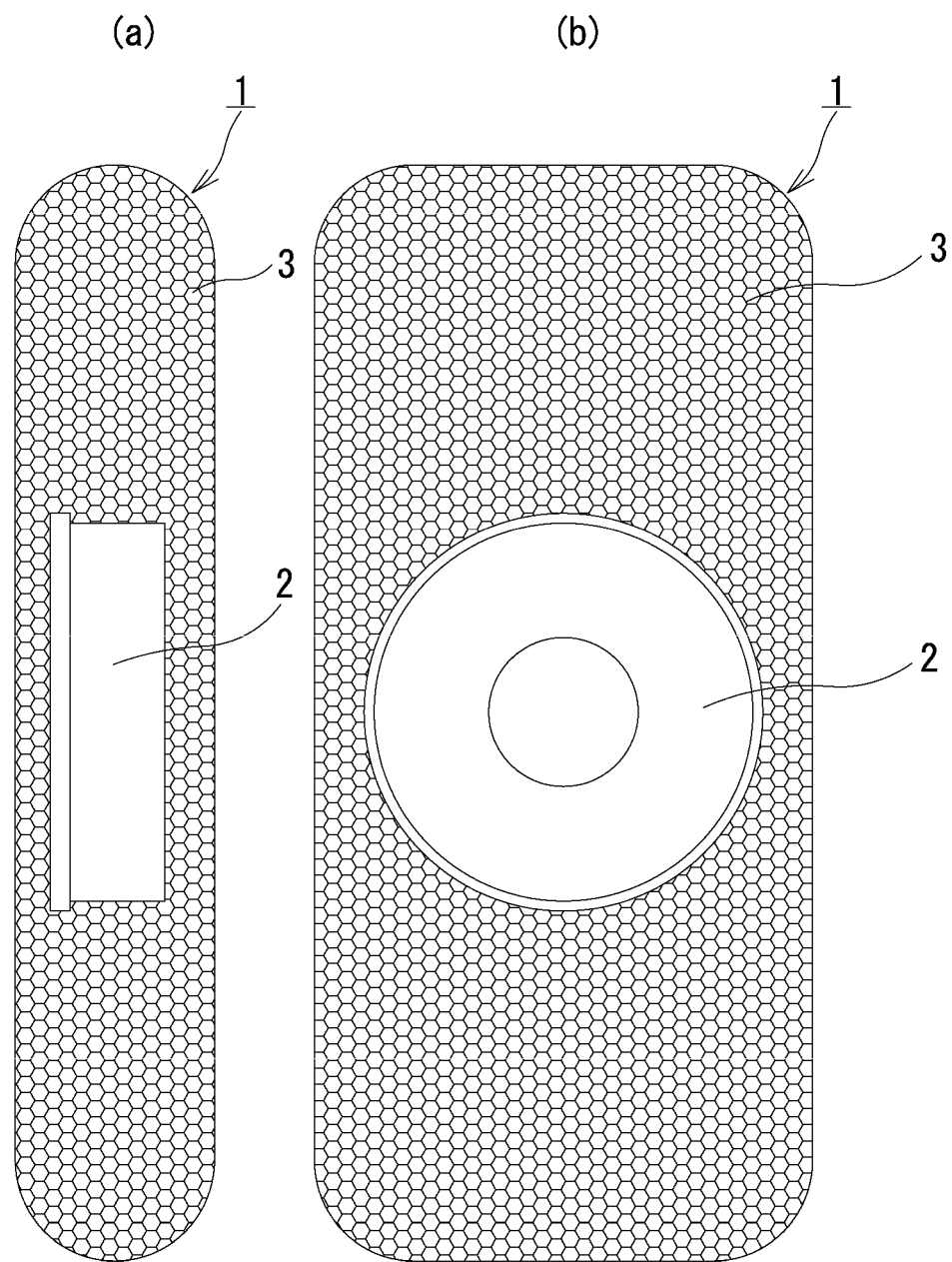
FIGS. 1(a) and 1(b) are a vertical cross sectional view and a horizontal cross sectional view illustrating main part of a self resonance-type sound-producing speaker according to embodiment 1 of the invention.

A self resonance-type sound-producing speaker 1 according to embodiment 1 is described in detail with reference to FIG. 1. This self resonance-type sound-producing speaker 1 includes an actuator speaker unit 2 (unless otherwise specified, hereinafter referred to as speaker unit 2) and a polymer foam 3 arranged to cover the entire outer surface of this speaker unit 2. The speaker unit 2 and the polymer foam 3 are formed to be integrated with each other.

The thickness of the polymer foam 3 is determined in a range that ensures the presence of a resonance structure.

The thickness of the resonance structure of the polymer foam 3 to the speaker unit 2 is preferably not less than 2 mm and is more preferably not less than 3 mm. More specifically, the thickness of the polymer foam 3 may be in the range of 2 mm to 10 mm for the small-size speaker unit 2 (thickness of 10 mm to 20 mm) and may be in the range of 3 mm to 40 mm for the medium-size or the large-size speaker unit 2 (thickness of or over 20 mm). The width of the resonance structure of the polymer foam 3 may be in the range of 100 to 150 mm. The width of the speaker unit 2 may be not greater than 30 mm. The width of the resonance structure of the polymer foam 3 is preferably three times to five times the width of the speaker unit 2. The length of the resonance structure of the polymer foam 3 may be in the range of 180 to 250 mm.

The polymer foam 3 preferably has the closed pore structure and the expansion ratio of 10 to 30 times.

For example, rigid polyurethane foam, rigid polystyrene foam, rigid polyethylene foam, rigid polypropylene foam, rigid phenol foam, rigid polyimide foam or rigid polyvinyl chloride foam may be used for the polymer foam 3.

The method of manufacturing the self resonance-type sound-producing speaker 1 tentatively places the actuator speaker unit 2 in a male/female mold at ordinary temperature, thoroughly mixes liquid polymer foam material (for example, rigid polyurethane resin) within several seconds, and injects the mixed liquid polymer foam material into the mold. The heat applied is only the heat of the polymer foam material. The foam of the high expansion ratio is preferably obtainable under no application of additional pressure by naturally introducing out the pressure produced in the course of foaming. The manufacturing method coats the speaker unit with the polymer foam without changing the shape of the speaker unit and without damaging the speaker unit by heat. The foam temperature may be ordinary temperature as described above or may preferably be the range of ordinary temperature to 80 degrees centigrade.

Covering the speaker unit 2 with the polymer foam 3 enables the resonance effect that resonates the sound and externally produces sound in the form of plane waves, thus enhancing the sound quality. Such covering prevents the frame from being exposed on the outside and has the waterproof effect. This eliminates the need to use any special tape for attachment of the frame and is thus free from the tape peel-off problem. This also eliminates the need to use any screws for fixation and is thus free from distortion of sound.

Figure 2:
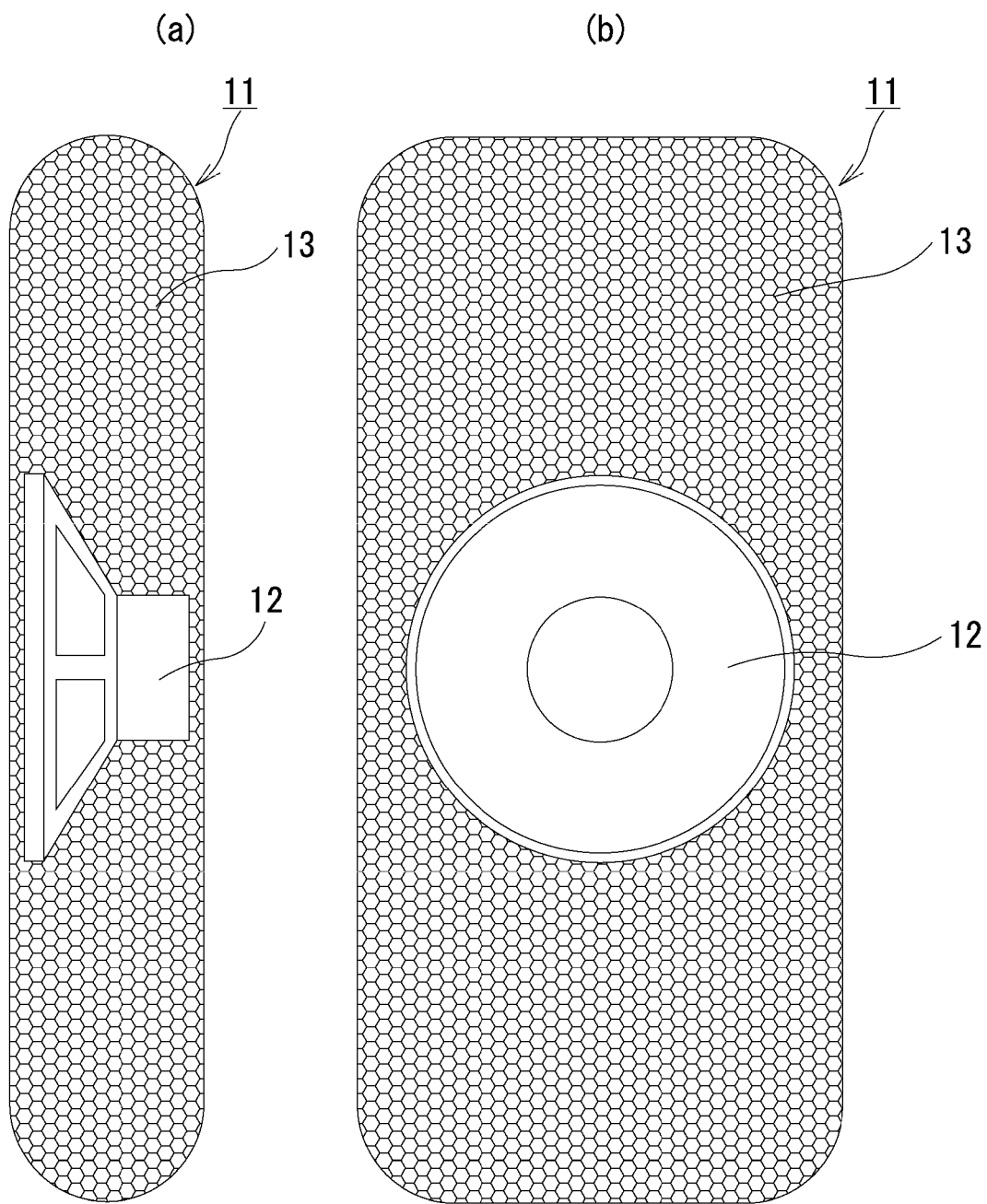
FIGS. 2(a) and 2(b) are a vertical cross sectional view and a horizontal cross sectional view illustrating main part of a self resonance-type sound-producing speaker according to embodiment 2 of the invention.

A self resonance-type sound-producing speaker 11 according to embodiment 2 is described in detail with reference to FIG. 2. The description of embodiment 1 is applicable to the structure of embodiment 2 similar or common to that of embodiment 1, and the difference is mainly described. embodiment 2 adopts a cone speaker 12 in place of the actuator speaker unit 2.

Figure 3:
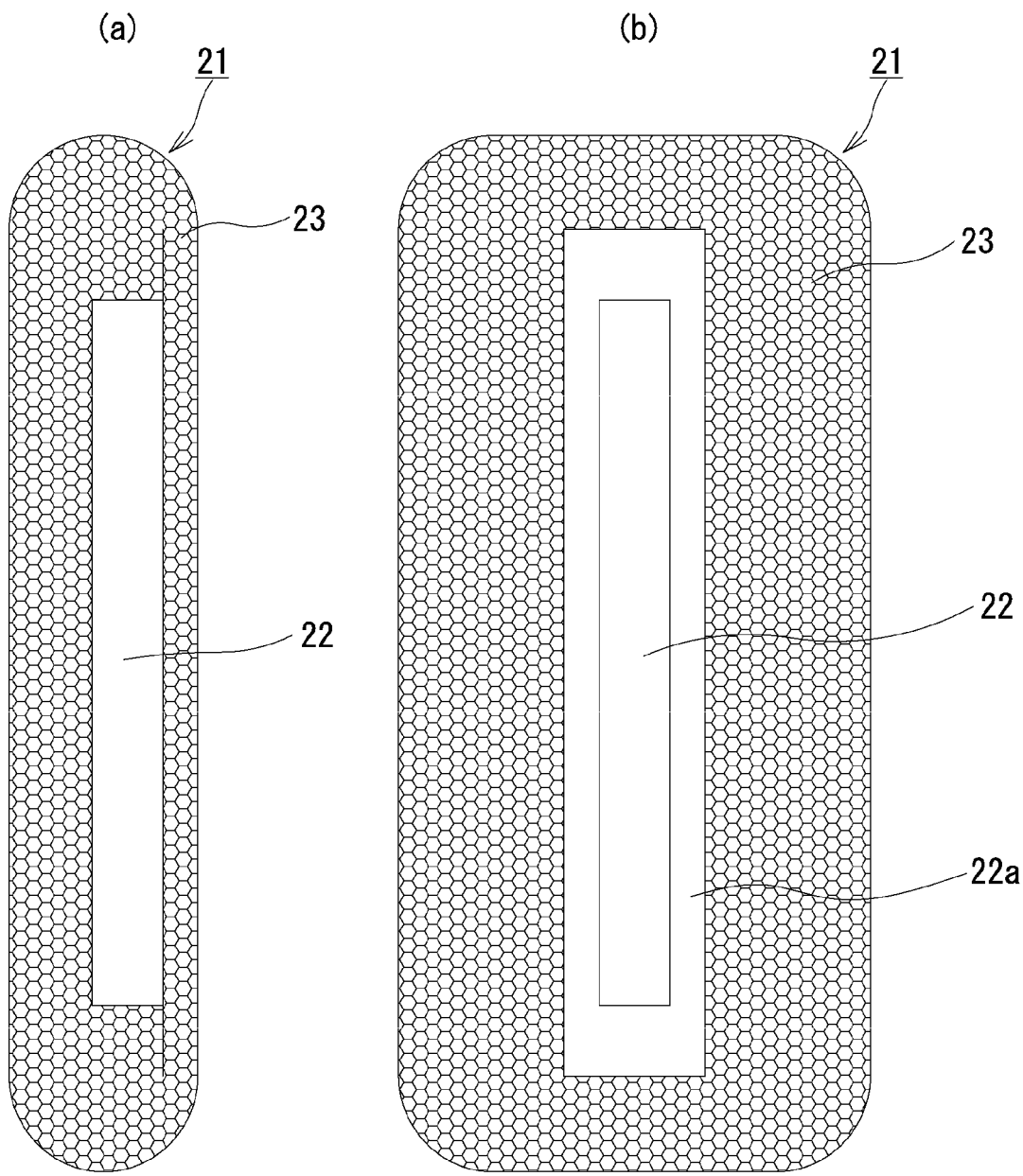
FIGS. 3(a) and 3(b) are a vertical cross sectional view and a horizontal cross sectional view illustrating main part of a self resonance-type sound-producing speaker according to embodiment 3 of the invention.

A self resonance-type sound-producing speaker 21 according to embodiment 3 is described in detail with reference to FIG. 3. The description of embodiment 1 is applicable to the structure of embodiment 3 similar or common to that of embodiment 1, and the difference is mainly described. embodiment 3 adopts a magnetostrictive speaker 22 in place of the actuator speaker unit 2. The magnetostrictive speaker 22 preferably has a bottom plate 22a having the larger area than the area of its bottom.

In any of the self resonance-type sound-producing speakers 1, 11 and 21 according to embodiments 1 to 3, the number of the embedded speaker unit is not limited to one but may be two or more. The speaker may be used as a wall-mounted speaker or a suspended speaker.

Figure 4:
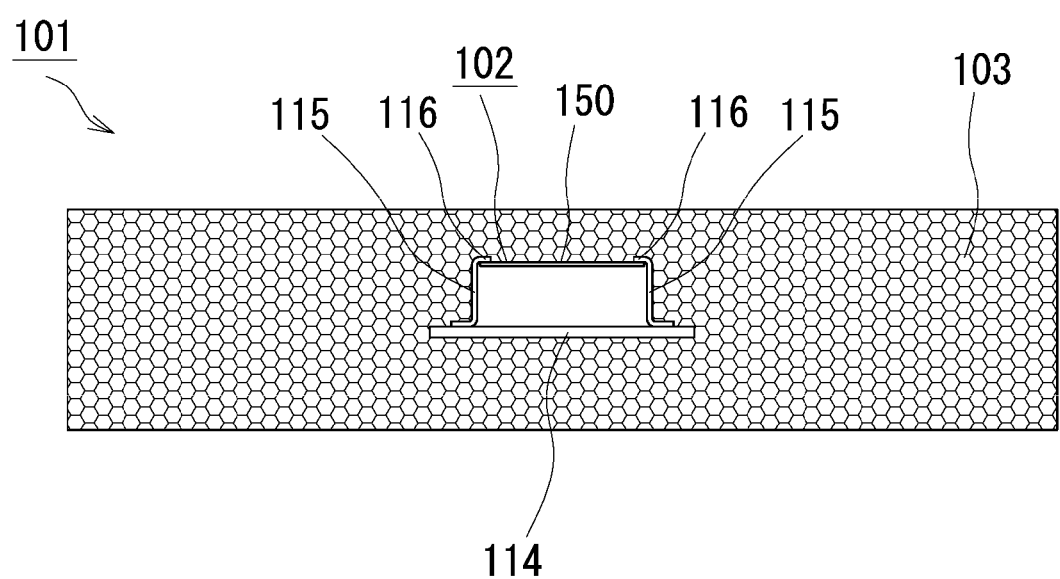
FIG. 4 is a vertical cross sectional view illustrating main part of a self resonance-type sound-producing speaker according to embodiment 4 of the invention.

A self resonance-type sound-producing speaker 101 according to embodiment 4 is described with reference to FIG. 4. The description of embodiment 1 is applicable to the structure of embodiment 4 similar or common to that of embodiment 1, and the difference is mainly described. The self resonance-type sound-producing speaker 101 according to embodiment 4 shown in FIG. 4 includes a speaker unit 102 and a polymer foam 103. The speaker unit 102 is provided as a hybrid speaker including a bottom plate 114, side plates 115 a top plate 116 as the frame, a vibrating membrane 150 as the sounding body, and a magnet (not shown).

The magnet (not shown) may be, for example, a permanent magnet such as ferrite magnet or neodymium magnet but is not limited to these examples. Mixing the sound attributed to the vibrating membrane 150 with the sound attributed to the magnet (not shown) advantageously enhances the resonance effect.

The vibrating membrane 150 and the side plates 115 are made of an aluminum alloy. Available examples of alumina alloy include series 1000, series 2000, series 3000, series 5000, series 6000 and series 7000. Since the speaker unit is covered with the polymer foam, the heat produced in the self resonance-type sound-producing speaker 101 cannot be released. In order to solve this problem, a thermochip (not shown) is incorporated for circuit interruption at fixed temperature or for reduction of electric current in the circuit at fixed temperature.

Part of the polymer foam 103 adjacent to the vibrating membrane 150 is preferably not less than 2 mm and is more preferably not less than 3 mm.

The following describes the functions of the self resonance-type sound-producing speaker 101 according to embodiment 4.

While the medium-pitch sound and the high-pitch sound are produced from the surface side (vibrating membrane 150-side), the low-pitch sound is produced from the rear side (bottom plate 114-side). The high-pitch sound out of the sound produced by the vibrating membrane 150 is directly propagated upward. The low-pitch sound is, on the other hand, propagated via the side plates 115 to the bottom plate 114, which is then vibrated to further propagate the low-pitch sound to the polymer foam 103. The high-frequency vibration out of the vibration produced by the magnet (not shown) is absorbed by an elastic member (not shown) inside the speaker unit 102 and is thus not transmitted to the bottom plate 114. The low-frequency vibration is, on the other hand, transmitted via the elastic member (not shown) to the bottom plate 114, which is then vibrated to reproduce the low-pitch sound.

As described above, the single self resonance-type sound-producing speaker 101 according to embodiment 4 can faithfully reproduce both the high-pitch sound and the low-pitch sound and does not require any additional speakers for reproduction of low-pitch sound, such as woofers.

Covering the speaker unit 102 with the polymer foam 103 mixes the sound attributed to the vibrating membrane with the sound attributed to the magnet (not shown) and enables the resonance effect that resonates the mixing sound and outputs the mixing sound upward (forward), thereby enhancing the sound quality. Such covering prevents the frame from being exposed on the outside and has the waterproof effect. This eliminates the need to use any special tape for attachment of the frame and is thus free from the tape peel-off problem. This also eliminates the need to use any screws for fixation and is thus free from distortion of sound.

Figure 5:
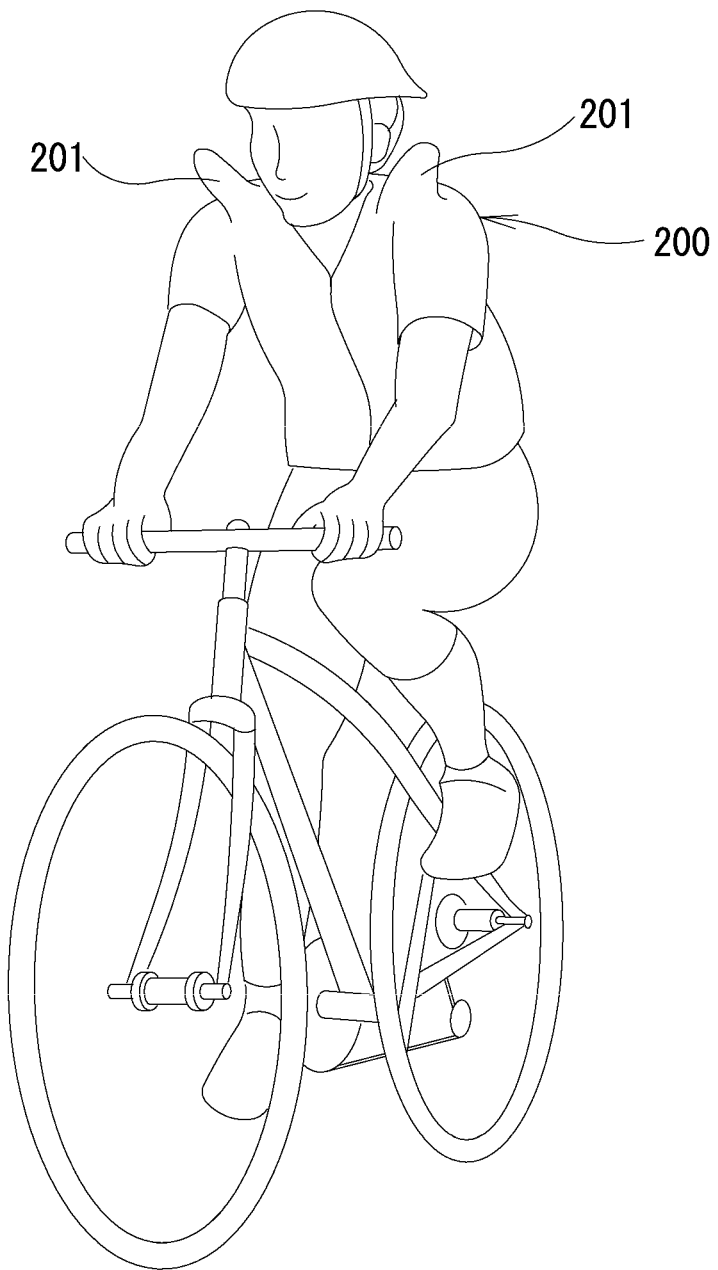
FIG. 5 is a perspective view illustrating the state that a person wearing a jacket equipped with a self resonance-type sound-producing speaker according to embodiment 5 of the invention rides a bicycle.
Figure 6:
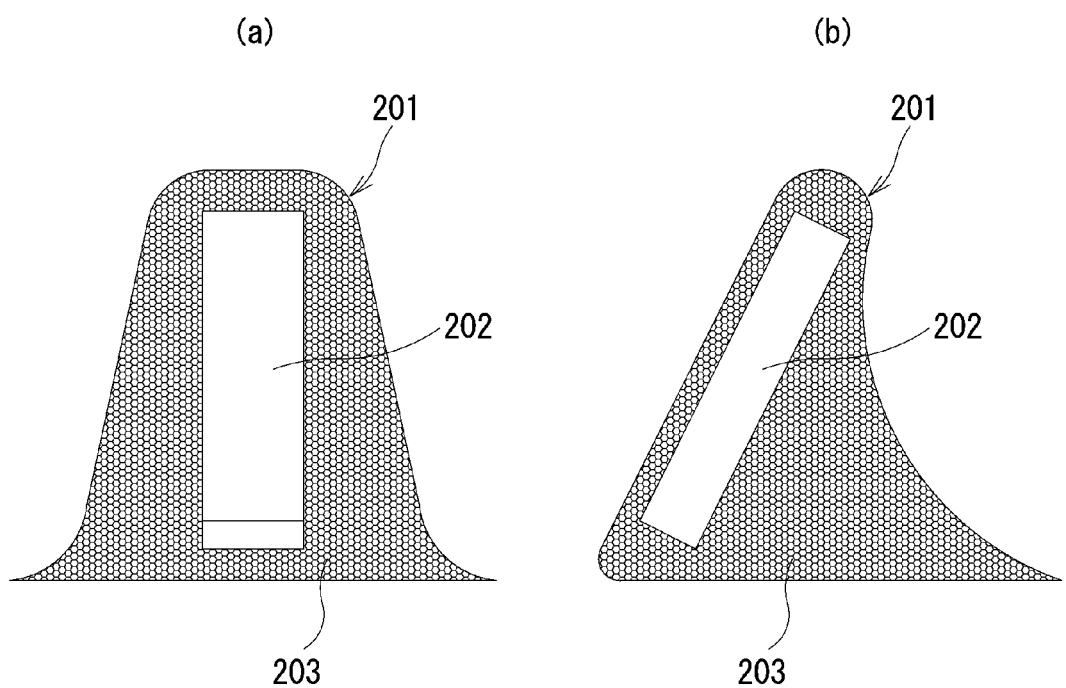
FIGS. 6(a) and 6(b) are vertical cross sectional views illustrating the self resonance-type sound-producing speaker according to embodiment 5 of the invention (taken on the orthogonal planes that are perpendicular to each other)

A self resonance-type sound-producing speaker 201 according to embodiment 5 is described with reference to FIGS. 5 and 6. The description of embodiment 1 is applicable to the structure of embodiment 5 similar or common to that of embodiment 1, and the difference is mainly described. The self resonance-type sound-producing speaker 201 according to embodiment 5 shown in FIGS. 5 and 6 includes a speaker unit 202 and a polymer foam 203. A pair of the self resonance-type sound-producing speakers 201 are mounted on the shoulders of a jacket 200 to be opposed to each other. As shown in FIGS. 6(a) and 6(b), the polymer foams 203 are formed to fit the jacket 200 and the user. The user wearing the jacket 200 can enjoy music output from the self resonance-type sound-producing speakers 201. The user is not required to have the self resonance-type sound-producing speakers in the ears like earphones and can simultaneously hear the environmental sound, such as signal sound or alarm. This ensures the safety of the user. The self resonance-type sound-producing speakers 201 are placed at both shoulders in the illustrated example of FIG. 5 but may be placed at arms or at the back. The description of embodiments 1 to 3 should be applied to the speaker unit 202.

Figure 7:
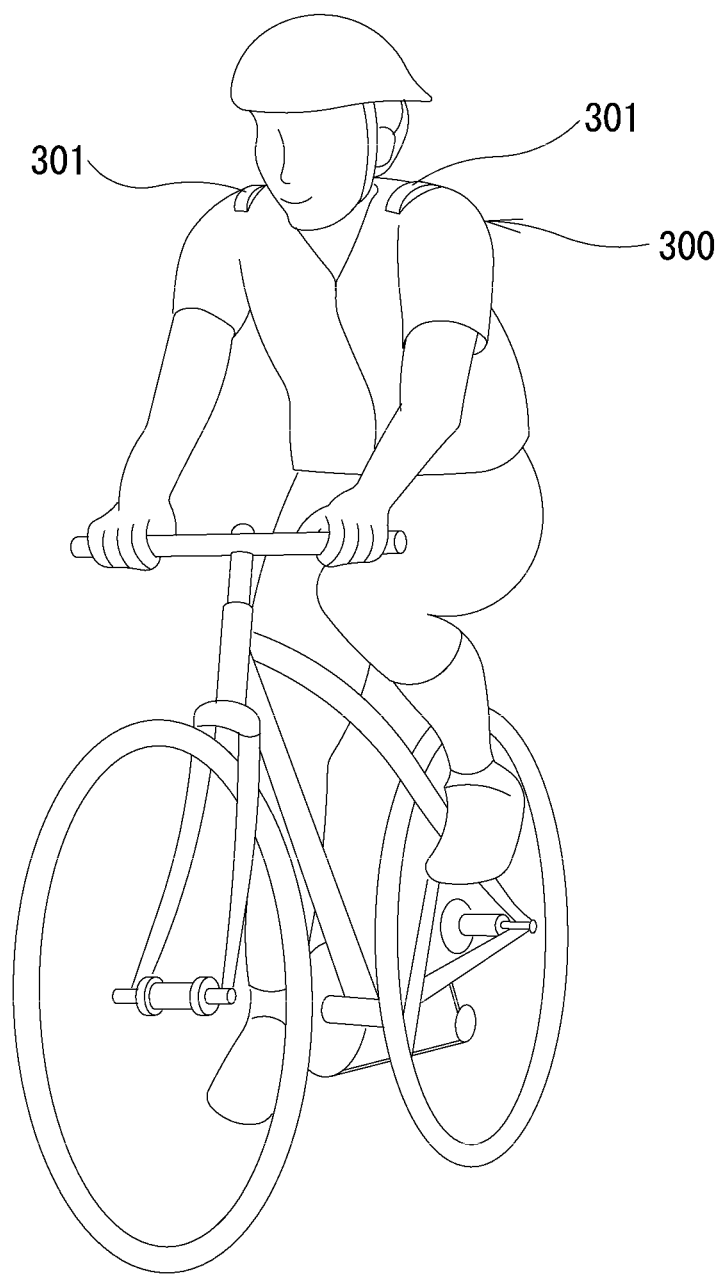
FIG. 7 is a perspective view illustrating the state that a person wearing a jacket equipped with a self resonance-type sound-producing speaker according to embodiment 6 of the invention rides a bicycle.

A self resonance-type sound-producing speaker 301 according to embodiment 6 is described with reference to FIG. 7. The description of embodiment 5 is applicable to the structure of embodiment 6 similar or common to that of embodiment 5, and the difference is mainly described. The self resonance-type sound-producing speakers 301 according to embodiment 6 shown in FIG. 7 have the lower height at the shoulders than the self resonance-type sound-producing speakers 201 according to embodiment 5. The self resonance-type sound-producing speakers 301 are curved along the front and the back of the human body.

Figure 8:
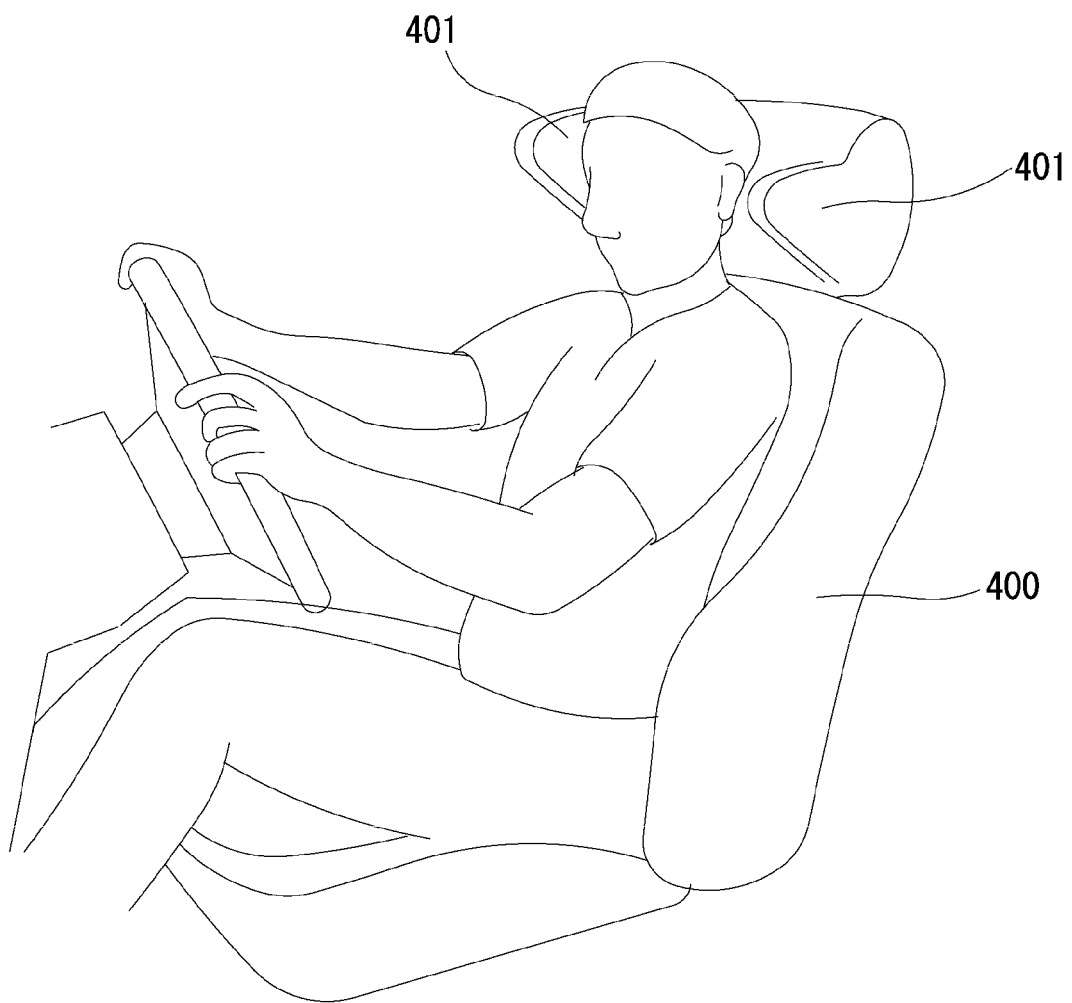
FIG. 8 is a perspective view illustrating the state that a person sitting on a seat equipped with a self resonance-type sound-producing speaker according to embodiment 7 of the invention drives an automobile.

A self resonance-type sound-producing speaker 401 according to embodiment 7 is described with reference to FIG. 8. The description of the above embodiments is applicable to the structure of embodiment 7 similar or common to those of the above embodiments, and the difference is mainly described. A pair of the self resonance-type sound-producing speakers 401 according to embodiment 7 shown in FIG. 8 are mounted in the upper headrest of the back of a seat 400 to be opposed to each other. The headrest with the self resonance-type sound-producing speakers 401 may be linked with the seat 400 by means of a hinge in a rotatable manner. The description of embodiments 1 to 3 should be applied to the detailed structure of the self resonance-type sound-producing speakers 401.

Figure 9:
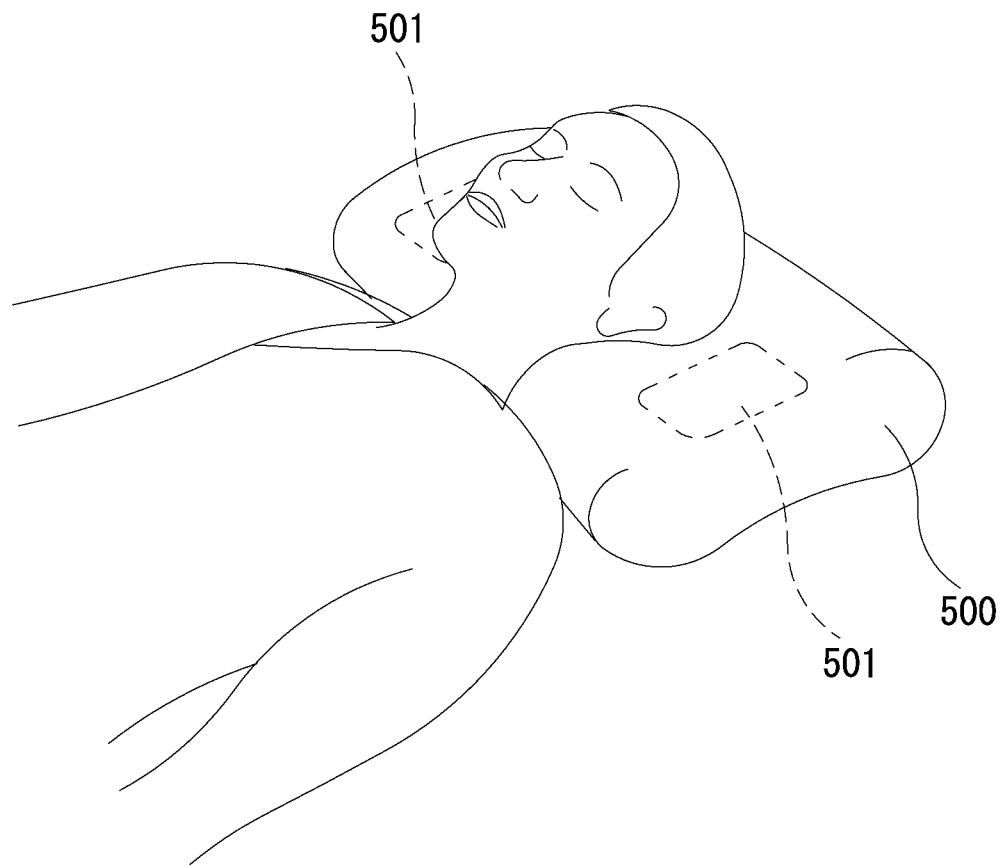
FIG. 9 is a perspective view illustrating the state that a person sleeps using a pillow equipped with a self resonance-type sound-producing speaker according to embodiment 8 of the invention.

A self resonance-type sound-producing speaker 501 according to embodiment 8 is described with reference to FIG. 9. The description of the above embodiments is applicable to the structure of embodiment 8 similar or common to those of the above embodiments, and the difference is mainly described. A pair of the self resonance-type sound-producing speakers 501 according to embodiment 8 shown in FIG. 9 are embedded at both ends of a pillow 500. The description of embodiments 1 to 3 should be applied to the structure of the self resonance-type sound-producing speakers 501. The self resonance-type sound-producing speakers 501 may be placed in a bed, instead of the pillow 500.

Figure 10:
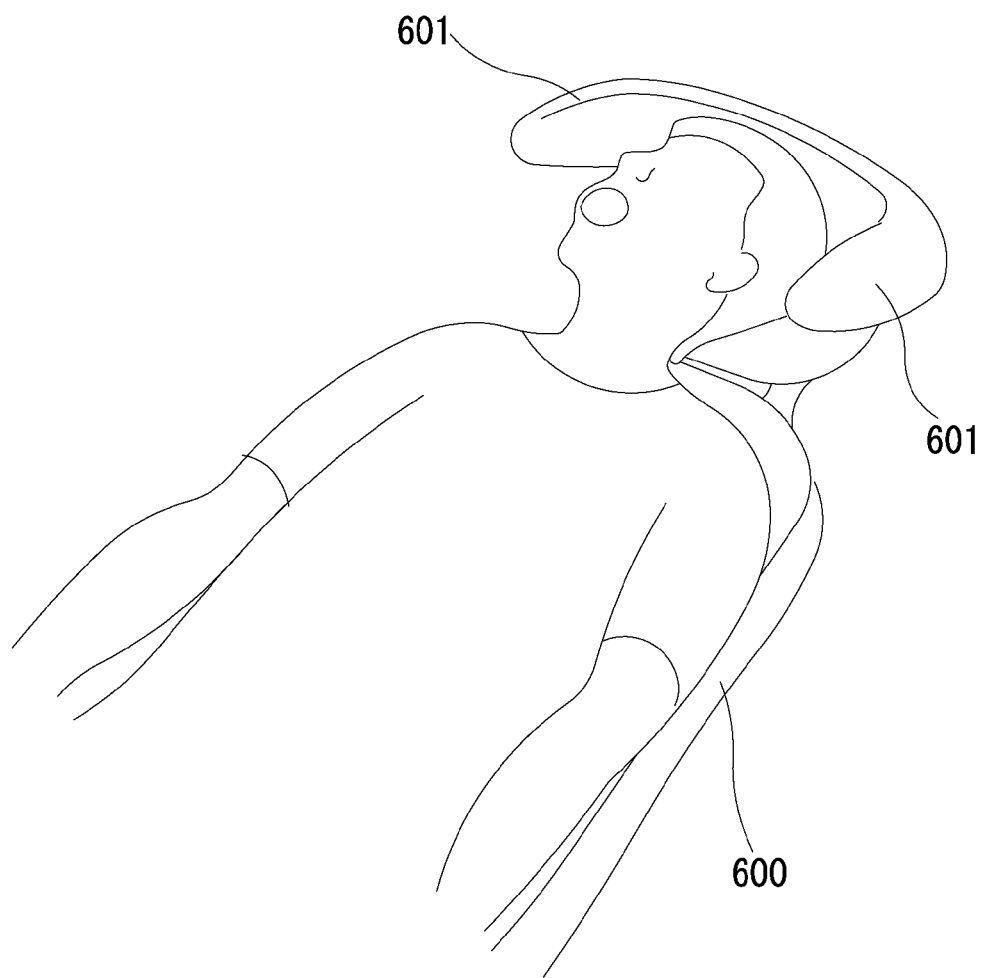
FIG. 10 is a perspective view illustrating the state that a patient is subjected to treatment using dental treatment equipment equipped with a self resonance-type sound-producing speaker according to embodiment 9 of the invention.

A self resonance-type sound-producing speaker 601 according to embodiment 9 is described with reference to FIG. 10. The description of the above embodiments is applicable to the structure of embodiment 9 similar or common to those of the above embodiments, and the difference is mainly described. A pair of the self resonance-type sound-producing speakers 601 according to embodiment 9 shown in FIG. 10 are mounted in the upper headrest of the back of a seat 600 in a medical institution, for example, a dental clinic, to be opposed to each other. The description of embodiments 1 to 3 should be applied to the structure of the self resonance-type sound-producing speakers 601. The seat 600 is not limited to the seat in the medical institute as shown in FIG. 10 but may be a seat located in, for example, a movie theater or a concert hall.

Figure 11:
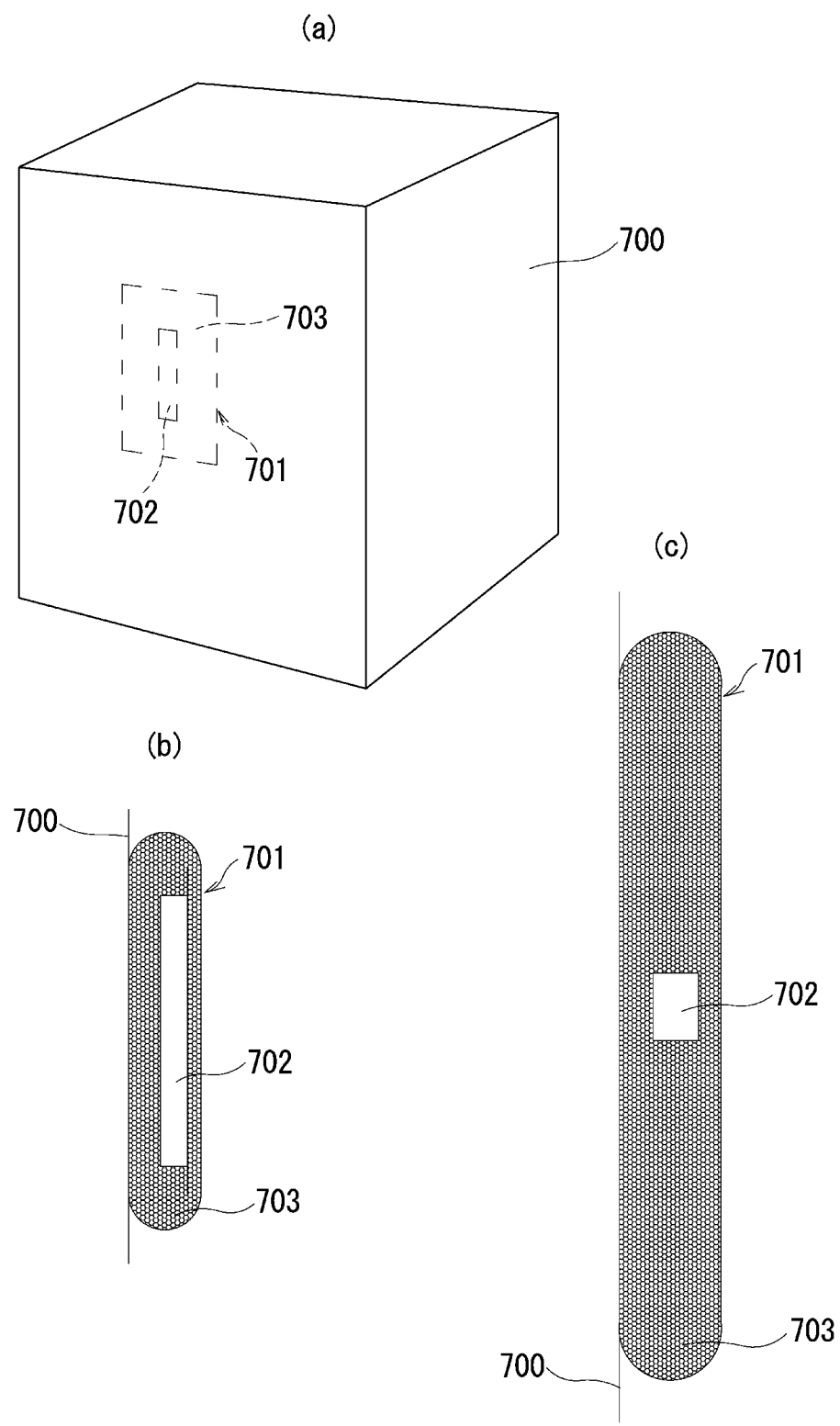
FIGS. 11(a), 11(b) and 11(c) are respectively a perspective view, a vertical cross sectional view and a horizontal cross sectional view illustrating a structure including a self resonance-type sound-producing speaker according to embodiment 10 of the invention.

A self resonance-type sound-producing speaker 701 according to embodiment 10 is described with reference to FIG. 11. The description of the above embodiments is applicable to the structure of embodiment 10 similar or common to those of the above embodiments, and the difference is mainly described. The self resonance-type sound-producing speaker 701 according to embodiment 10 shown in FIG. 11 is protected by a building frame 700 of, for example, outdoor construction, such as wall surface, pillar and ceiling of public construction, in a public space that does not allow exposure of the sound source. A polymer foam 703 covering a speaker unit 702 is attached to the rear face of the speaker 701, and the amplification function of the polymer foam 703 is utilized for sound production. The building frame 700 made of metal works as an attachment plate that transmits the vibration generated by the speaker unit 702 through the polymer foam 703 to outside. In general, the metal generates less vibration. Attaching the polymer foam 703 to the metal enables the metal to vibrate together with the polymer foam 703 and to be resonated, thereby enabling sound production.

Figure 12:
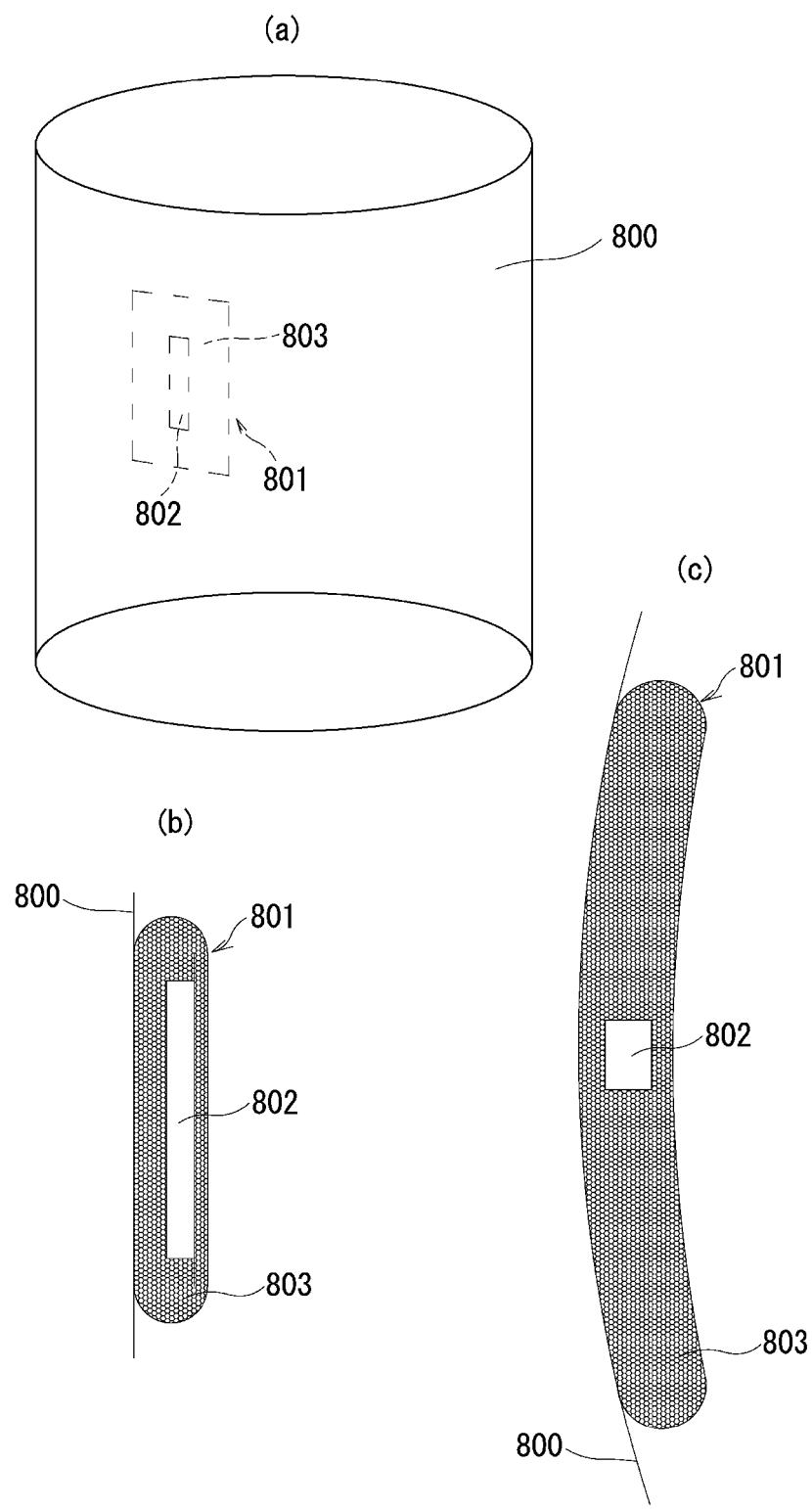
FIGS. 12(a), 12(b) and 12(c) are respectively a perspective view, a vertical cross sectional view and a horizontal cross sectional view illustrating a structure including a self resonance-type sound-producing speaker according to embodiment 11 of the invention.

A self resonance-type sound-producing speaker 801 according to embodiment 11 is described with reference to FIG. 12. The description of the above embodiments is applicable to the structure of embodiment 11 similar or common to those of the above embodiments, and the difference is mainly described. The self resonance-type sound-producing speaker 801 according to embodiment 11 shown in FIG. 12 is similar to the speaker 701 of the above embodiment, except that a building frame 800 has a curved surface, while the building frame 700 has the flat surface.

A self resonance-type sound-producing speaker may be attached to a rear face at a location that is to be protected by metal, for example, an automatic vending machine, a car washing machine, a laundry machine, or any of various industrial machines, although not being specifically illustrated. The self resonance-type sound-producing speaker may also be applicable to a location easily exposed to water, for example, lavatory (toilet bowl, remote control and wall, ceiling and floor of the room), bathroom (bathtub, remote control and wall, ceiling and floor of the room), dressing room, or kitchen.

Figure 13:
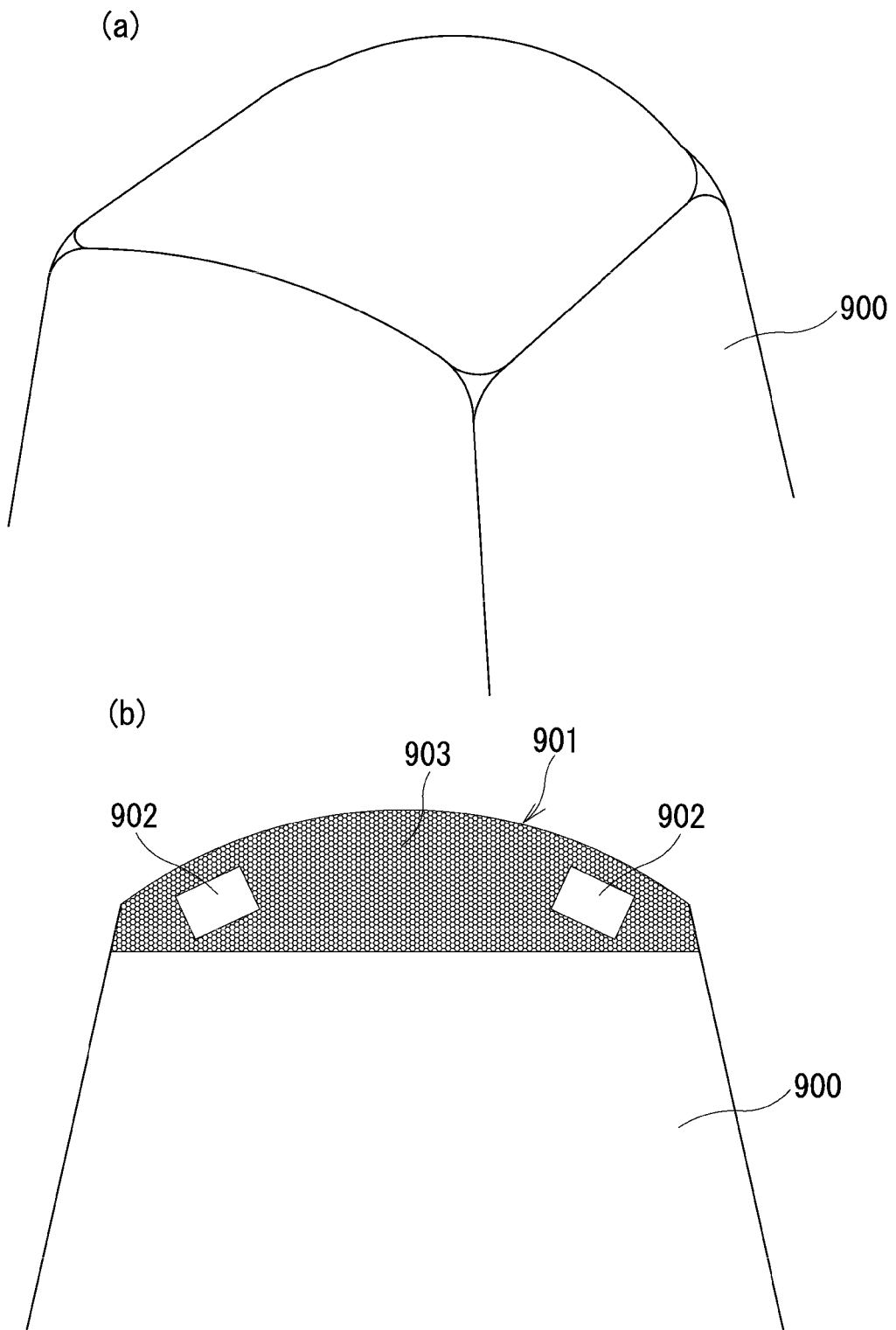
FIGS. 13(a) and 13(b) are a perspective view and a cross sectional view illustrating a casing including a self resonance-type sound-producing speaker according to embodiment 12 of the invention.

A self resonance-type sound-producing speaker 901 according to embodiment 12 is described with reference to FIG. 13. The description of the above embodiments is applicable to the structure of embodiment 12 similar or common to those of the above embodiments, and the difference is mainly described. The self resonance-type sound-producing speaker 901 according to embodiment 12 shown in FIG. 13 includes speaker units 902 and a polymer foam 903 for covering the speaker units 902, which are placed inside of a casing 900. The polymer foam 903 is accordingly not exposed on the outside.

Figure 14:
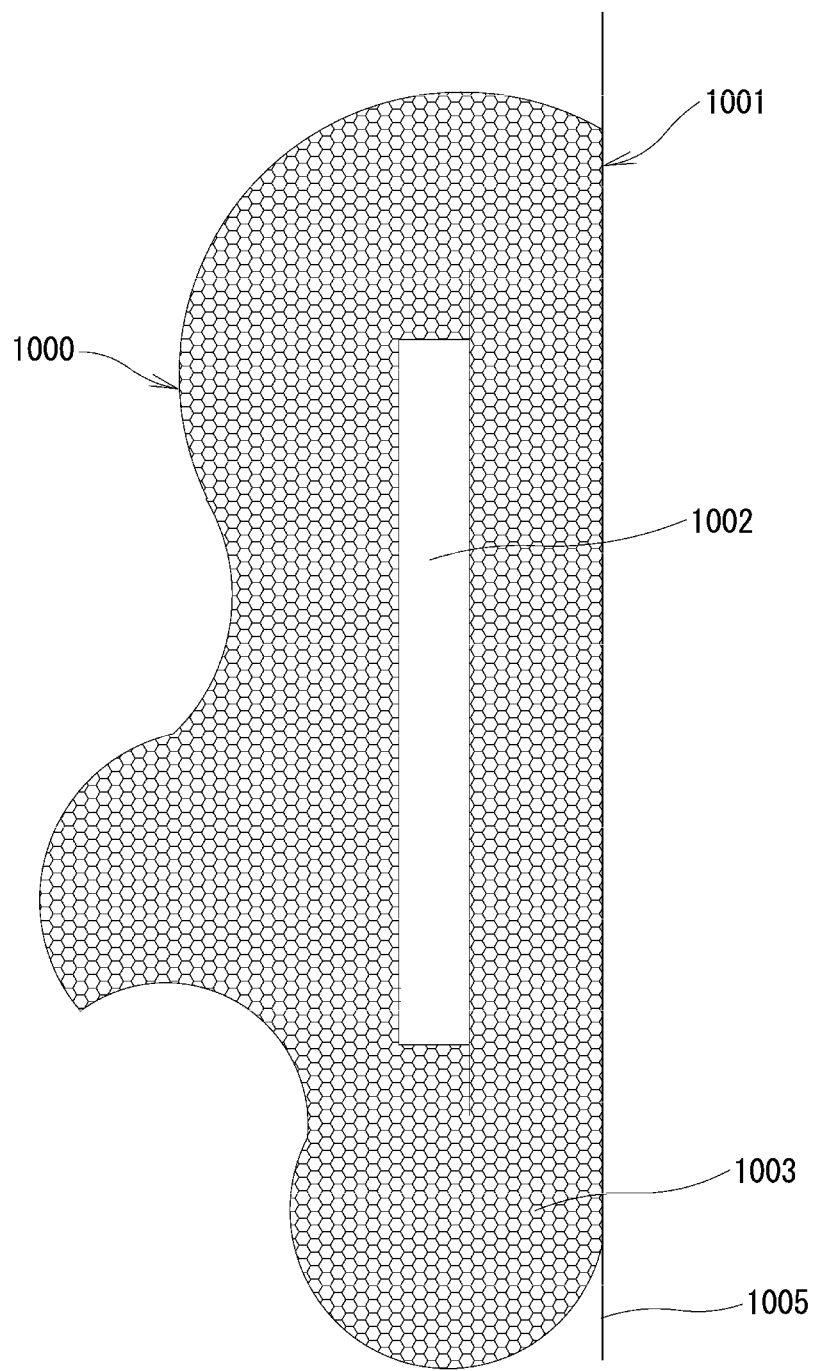
FIG. 14 is a vertical cross sectional view illustrating the state that a self resonance-type sound-producing speaker according to embodiment 13 of the invention is fixed to an attachment surface in a concavo-convex shape.

A self resonance-type sound-producing speaker 1001 according to embodiment 13 is described with reference to FIG. 14. The description of the above embodiments is applicable to the structure of embodiment 13 similar or common to those of the above embodiments, and the difference is mainly described. When an attachment surface 1000 of an object 1005 is in a concavo-convex shape, the self resonance-type sound-producing speaker 1001 according to embodiment 13 shown in FIG. 14 includes a polymer foam 1003 directly injected and solidified. A speaker unit 1002 is tentatively set at a position coverable with the polymer foam 1003, and the polymer foam 1003 is then injected into the space between the speaker unit 1002 and the attachment surface 1000 and is solidified. This enables the self resonance-type sound-producing speaker 1001 to be readily attached to even the attachment surface in the concavo-convex shape that has difficulty in attachment.

Figure 15:
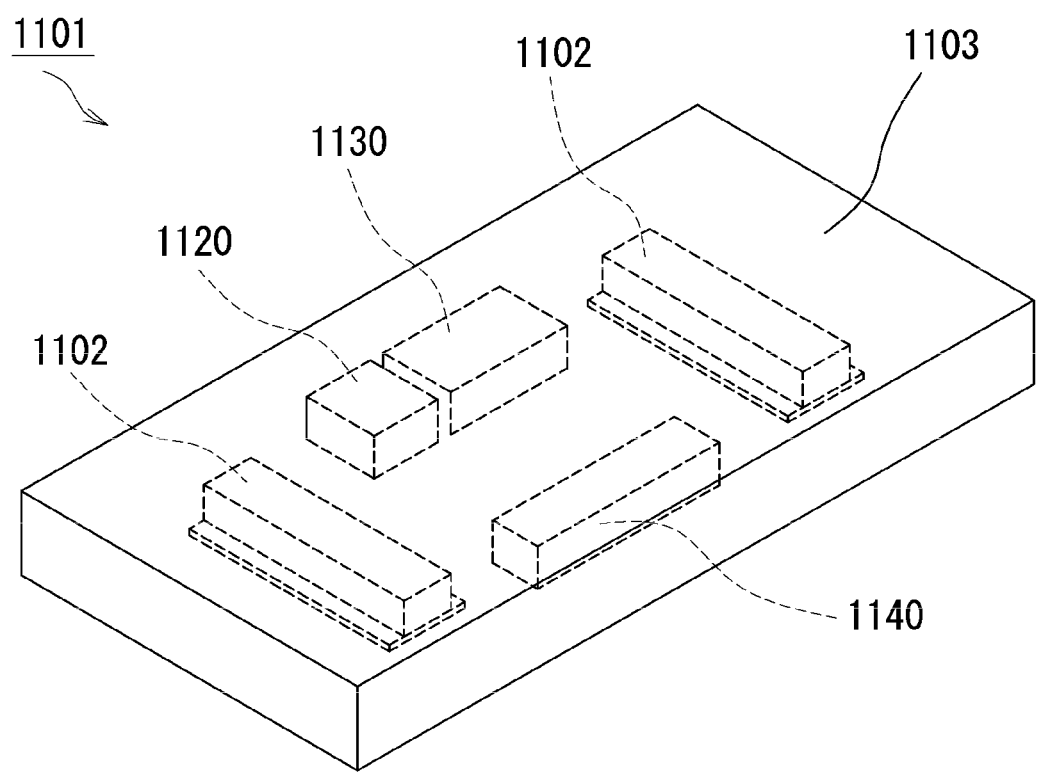
FIG. 15 is a perspective view illustrating a self resonance-type sound-producing speaker according to embodiment 14 of the invention.

A self resonance-type sound-producing speaker 1101 according to embodiment 14 is described with reference to FIG. 15. The description of the above embodiments is applicable to the structure of embodiment 14 similar or common to those of the above embodiments, and the difference is mainly described. The self resonance-type sound-producing speaker 1101 according to embodiment 14 shown in FIG. 15 includes speaker units 1102, an amplifier 1120, a battery 1130 and a wireless module 1140, which are all covered with a polymer foam 1103. In the self resonance-type sound-producing speakers of the above embodiments, the speaker unit is connectable with an external amplifier by wire. The self resonance-type sound-producing speaker 1101 according to embodiment 14 is wireless and is portable. As shown in FIG. 15, the self resonance-type sound-producing speaker 1101 may be formed directly in a cushion or a pillow by using the polymer foam 1103. Alternatively the self resonance-type sound-producing speaker 1101 may be further wrapped with another elastic material to be formed in a cushion or a pillow (FIG. 9).

The method of manufacturing the self resonance-type sound-producing speaker 1101 tentatively sets the amplifier 1120, the battery 1130, and the wireless module 1140, injects the polymer foam 1103 to cover over these elements, and foams and solidifies the injected polymer foam 1103. The outer surfaces of the speaker units 1102 are fully covered with the polymer foam 1103. The amplifier 1120, the battery 1130 and the wireless module 1140 may, however, not be necessarily fully covered with the polymer foam 1103 but may be partly exposed for the convenience of external operation or maintenance. This manufacturing method is not restrictive. Another method of manufacturing the self resonance-type sound-producing speaker 1101 may apply the polymer foam 1103 formed in advance to the speaker units 1102 to be integrated with the amplifier 1120, the battery 1130 and the wireless module 1140. Yet another method of manufacturing the self resonance-type sound-producing speaker 1101 may embed the speaker units 1102, the amplifier 1120, the battery 1130 and the wireless module 1140 in the polymer foam 1103 formed in advance.

The invention is not limited to the above embodiments but various modifications and variations may be made to the embodiments without departing from the scope of the invention. Such modifications and variations, as well as their equivalents are also included in the scope of the invention. According to embodiments 5 to 9, the self resonance-type sound-producing speaker may be made movable, for example, may be linked with the seat or the pillow with a hinge in a rotatable manner. The self resonance-type sound-producing speaker may be made receivable in the seat or the pillow. In the movie theater, woofers may be provided separately. In the movie theater, the dub may be output from the self resonance-type sound-producing speakers 10 in the seat, separately from the original sound on the front screen. This allows the audience to simultaneously hear the original sound and the dub. The present invention is also applicable to the wall-mounted speaker or the suspended speaker.

REFERENCE SIGNS LIST

1, 11, 21, 101, 201, 301, 401, 501, 601, 701, 801, 901, 1001, 1101: Self resonance-type sound-producing speaker
2, 12, 22, 102, 202, 302, 402, 502, 602, 702, 802, 902, 1002, 1102: Speaker unit
3, 13, 23, 103, 203, 303, 403, 503, 603, 703, 803, 903, 1003, 1103: Polymer foam

The invention claimed is:

1. A self resonance-type sound-producing speaker, comprising:
    a speaker unit; and
    a polymer foam arranged to fully cover an outer surface of the speaker unit;
wherein:
    the polymer foam amplifies sound-producing vibration from the speaker unit and produces sound in the form of plane waves;
    an attachment plate is provided outside of the polymer foam to resonate and transmit the sound-producing vibration to outside; and
    the speaker unit is tentatively placed, and the polymer foam is injected into a space between the speaker unit and the attachment plate and is solidified to cover the outer surface of the speaker unit.

2. The speaker of claim 1, wherein the polymer foam has a closed pore structure and an expansion ratio of 10 to 30 times.

3. The speaker of claim 1, wherein the polymer foam has a thickness equal to or greater than 2 mm relative to the speaker unit.

4. The speaker of claim 1, wherein the speaker is placed on an inner face of a casing included in external equipment, and the casing is used as the attachment plate.

5. The speaker of claim 1, wherein the attachment plate is placed outside of external equipment, and the polymer foam is attached to a rear face of the attachment plate.

6. The speaker of claim 1, wherein the attachment plate is in a concavo-concave shape.

7. A method of placing a self resonance-type sound-producing speaker, the method comprising:
    a tentative positioning step of tentatively placing a speaker unit inside of a casing included in external equipment whereby a distance is kept between the casing and the speaker unit;
    an injection step of injecting a polymer foam material into the space; and
    a foaming step of filling the space with the injected polymer foam material and foaming the polymer foam material;
wherein:
    the casing is used as an attachment plate that resonates and transmits sound-producing vibration to outside.

8. The method of claim 7, wherein foaming the polymer foam material is performed without heating the polymer foam material.

9. A self resonance-type sound-producing speaker, comprising:
    a speaker unit comprising a bottom plate, a top plate, two side plates, and a vibrating membrane; and
    a polymer foam arranged to fully cover an outer surface of the speaker unit;
wherein:
    the vibrating membrane is disposed between the two side plates and disposed under the top plate, and the vibrating membrane produces a medium-pitched sound and a high-pitched sound;
    the bottom plate produces a low-pitched sound; and
    the polymer foam amplifies and mixes the high-pitched sound, the medium-pitched sound, and the low-pitched sound.

* * * * *